US007423005B2

(12) United States Patent
Stolte et al.

(10) Patent No.: US 7,423,005 B2
(45) Date of Patent: Sep. 9, 2008

(54) BINDING AGENT FOR SOLIDIFICATION MATRIX

(75) Inventors: Roger L. Stolte, Maplewood, MN (US); Michael E. Besse, Golden Valley, MN (US); Terry J. Klos, Victoria, MN (US); Kevin R. Bradt, West River Falls, WI (US); Michael P. Dziuk, Oakdale, MN (US)

(73) Assignee: Ecolab Inc., St. Paul, MN (US)

( * ) Notice: Subject to any disclaimer, the term of this patent is extended or adjusted under 35 U.S.C. 154(b) by 385 days.

(21) Appl. No.: 10/717,729

(22) Filed: Nov. 20, 2003

(65) Prior Publication Data

US 2005/0113278 A1 May 26, 2005

(51) Int. Cl.

| | |
|---|---|
| ***C11D 17/00*** | (2006.01) |
| ***C11D 3/33*** | (2006.01) |
| ***C11D 11/00*** | (2006.01) |
| ***A01N 25/08*** | (2006.01) |

(52) U.S. Cl. ....................... 510/445; 510/224; 510/294; 510/298; 510/451; 510/480; 424/409

(58) Field of Classification Search ................. 510/445, 510/224, 294, 298, 451, 480; 424/409
See application file for complete search history.

(56) References Cited

U.S. PATENT DOCUMENTS

| | | | | |
|---|---|---|---|---|
| 3,048,548 A | | 8/1962 | Martin et al. | |
| 3,334,147 A | | 8/1967 | Brunelle et al. | |
| 3,920,564 A | * | 11/1975 | Grecsek | 510/332 |
| 4,322,361 A | * | 3/1982 | Wilson et al. | 556/50 |
| 4,397,776 A | * | 8/1983 | Ward | 510/407 |
| 4,416,809 A | * | 11/1983 | Magari et al. | 510/477 |
| 4,426,362 A | | 1/1984 | Copeland et al. | |
| 4,560,492 A | * | 12/1985 | Curry et al. | 510/340 |
| 4,595,520 A | | 6/1986 | Heile et al. | |
| 4,663,071 A | * | 5/1987 | Bush et al. | 510/361 |
| 4,680,134 A | | 7/1987 | Heile et al. | |
| 4,687,121 A | | 8/1987 | Copeland | |
| 4,690,305 A | | 9/1987 | Copeland | |
| RE32,763 E | | 10/1988 | Fernholtz et al. | |
| RE32,818 E | | 1/1989 | Fernholz et al. | |
| 4,826,661 A | | 5/1989 | Copeland et al. | |
| 4,830,773 A | | 5/1989 | Olson | |
| 4,919,838 A | * | 4/1990 | Tibbetts et al. | 510/120 |
| 5,340,501 A | * | 8/1994 | Steindorf | 510/224 |
| 5,472,633 A | * | 12/1995 | Griffin et al. | 252/189 |
| 5,876,514 A | * | 3/1999 | Rolando et al. | 134/25.2 |
| 6,060,444 A | * | 5/2000 | Schulz et al. | 510/451 |
| 6,150,324 A | | 11/2000 | Lentsch et al. | |
| 6,156,715 A | | 12/2000 | Lentsch et al. | |
| 6,177,392 B1 | | 1/2001 | Lentsch et al. | |
| 6,211,128 B1 | * | 4/2001 | Black | 510/191 |
| 6,258,765 B1 | | 7/2001 | Wei et al. | |
| 6,410,495 B1 | * | 6/2002 | Lentsch et al. | 510/224 |
| 6,436,893 B1 | * | 8/2002 | Lentsch et al. | 510/446 |
| 6,451,224 B1 | | 9/2002 | Wilson | 252/182.29 |
| 6,583,094 B1 | * | 6/2003 | Lentsch et al. | 510/224 |
| 6,653,266 B2 | * | 11/2003 | Wei et al. | 510/224 |
| 6,660,707 B2 | * | 12/2003 | Lentsch et al. | 510/445 |
| 6,686,325 B2 | * | 2/2004 | Hoyt et al. | 510/225 |
| 6,831,054 B2 | * | 12/2004 | Lentsch et al. | 510/446 |
| 2003/0109403 A1 | | 6/2003 | Man et al. | 510/367 |
| 2003/0162685 A1 | | 8/2003 | Man et al. | 510/445 |

FOREIGN PATENT DOCUMENTS

| | | | |
|---|---|---|---|
| EP | 0796911 A1 | * | 9/1997 |
| GB | 818151 | * | 8/1959 |
| GB | 1513550 | * | 6/1978 |
| WO | WO 03/048291 | | 6/2003 |

OTHER PUBLICATIONS

Kirk-Othmer, Encyclopedia of Chemical Technology, vol. 5(4):764-795, no date available.

* cited by examiner

*Primary Examiner*—Lorna M Douyon
(74) *Attorney, Agent, or Firm*—Andrew D. Sorensen; Anneliese S. Mayer

(57) ABSTRACT

Material, composition, and manufacturing method alternatives for a solidification matrix that may be used, for example, in solid cleaning compositions, or other technologies. In at least some embodiments, the solidification matrix includes a binding agent that is formed by the use of hydroxyethylethylenediaminetriacetic acid (HEDTA), or a derivative thereof, and water to produce a solid binding agent. In some embodiments, the HEDTA and water combines and can solidify to act as a binder material or binding agent dispersed throughout a solid composition that may contain other functional ingredients that provide the desired properties and/or functionality to the solid composition.

40 Claims, No Drawings

BINDING AGENT FOR SOLIDIFICATION MATRIX

FIELD OF THE INVENTION

The invention relates to a binding agent that can be used to bind functional materials that can be manufactured in the form of a solid composition, and in some particular embodiments, relates to solid cleaning compositions including such binding agent.

BACKGROUND

The use of solidification technology and solid block detergents in institutional and industrial operations was pioneered in the SOLID POWER® brand technology disclosed and claimed in Fernholz et al., U.S. Reissue Pat. Nos. 32,763 and 32,818. Additionally, sodium carbonate hydrate cast solid products using substantially hydrated sodium carbonate materials was disclosed in Heile et al, U.S. Pat. Nos 4,595,520 and 4,680,134. In recent years attention has been directed to producing highly effective detergent materials from less caustic materials such as soda ash also known as sodium carbonate. It was found, and disclosed and claimed in U.S. Pat. Nos. 6,258.765, 6,156,715, 6,150,324, and 6,177,392, that a solid block functional material can be made using a binding agent that includes a carbonate salt, an organic acetate or phosphonate component and water. Each of these different solidification technologies has certain advantages and disadvantages. There is an ongoing need to provide alternative solidification technologies within the art.

SUMMARY

The invention relates to solidification technology, and in some embodiments provides material, composition, and manufacturing method alternatives for a solidification matrix that may be used, for example, in solid cleaning compositions, or other technologies. In at least some embodiments, the solidification matrix includes a binding agent that is formed by the use of hydroxyethylethylenediaminetriacetic acid (HEDTA), or a derivative thereof, and water to produce a solid binding agent, as described in more detail hereinafter.

In some embodiments, the HEDTA and water combines and can solidify to act as a binder material or binding agent dispersed throughout a solid composition that may contain other functional ingredients that provide the desired properties and/or functionality to the solid composition. For example, the binding agent may be used to produce a solid cleaning composition that includes the binding agent and a substantial proportion, sufficient to obtain desired functional properties, of one or more active and/or functional ingredient such as chelating/sequestering agents; inorganic detergents or alkaline sources; organic detergents, surfactants or cleaning agents; rinse aids; bleaching agents; sanitizers/anti-microbial agents; activators; detergent builders or fillers; defoaming agents, anti-redeposition agents; optical brighteners; dyes/odorants; secondary hardening agents/solubility modifiers; pesticides and/or baits for pest control; or the like, or a broad variety of other functional materials, depending upon the desired characteristics and/or functionality of the composition. The solid integrity of the functional material can be maintained by the presence of the binding component comprising HEDTA and water. This binding component can be distributed throughout the solid and can bind other functional ingredients into a stable solid composition.

The above summary of some embodiments is not intended to describe each disclosed embodiment or every implementation of the present invention. The Detailed Description of Some Example Embodiments which follows more particularly exemplify some of these embodiments. While the invention is amenable to various modifications and alternative forms, specifics thereof will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF SOME EXAMPLE EMBODIMENT

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

Weight percent, percent by weight, wt %, wt-%, % by weight, and the like are synonyms that refer to the concentration of a substance as the weight of that substance divided by the weight of the composition and multiplied by 100.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

As indicated in the Summary, in some respects, the invention is directed to solid compositions and method of forming such solid compositions. Such compositions include a solidification matrix having a binder agent, and optionally include additional functional ingredients or compositions. The functional ingredients or compositions can include conventional functional agents and other active ingredients that will vary according to the type of composition being manufactured in a solid matrix formed by the binding agent. Some embodiments are suitable for preparing a variety of solid cleaning compositions, as for example, a cast solid, a molded solid, an extruded solid, a formed solid, or the like. In at least some embodiments, the binding agent includes and/or is formed by HEDTA and water.

It has been discovered that in at least some embodiments, HEDTA and water can be combined to form a solid binding agent. While not wishing to be bound by theory, it is believed that in at least some embodiments, the HEDTA and water may combine to form an HEDTA hydrate that can solidify and provide for a solid binding agent in which additional functional materials may be found to form a functional solid composition. In our experimentation with respect to the use of HEDTA and water to form a solid binding agent, evidence for the formation of a solid composition including a distinct species formed from HEDTA and water has been found. For example, as will be discussed further in the Examples set fourth below, a mixture of HEDTA and water alone can form a solid binding composition. Additionally, analysis of some embodiments through differential scanning calorimetry (DSC) indicates the formation of a solid binding agent including a distinct species formed with HEDTA and water. HEDTA is generally known as a water soluble chelating agent, but has not been reported as a component in a binding agent for a solidification complex material.

The Binding Agent

As discussed above, in at least some embodiments, the binding agent comprises a chelating agent such as HEDTA, or a derivative thereof, and water. In some embodiments, the relative amounts of water and HEDTA can be controlled within a composition to form the binding agent which solidifies. For example, in some embodiments, the mole ratio of HEDTA to water present to form the binding agent can be in the range of about 1:6.25 to about 1:1. In some embodiments, the mole ratio of water to HEDTA can be in the range of about 1:5.88 to about 1:1.06 , and in some embodiments, in the range of about 1:3.125 to about 1:1.35.

The binding agent can be used to form a solid composition including additional components or agents, such as additional functional material. As such, in some embodiments, the binding agent (including water and HEDTA) can provide only a very small amount of the total weight of the composition, or may provide a large amount, or even all of the total weight of the composition, for example, in embodiments having few or no additional functional materials disposed therein. For example, in some embodiments, the water used in creating the binding agent can be present in the composition in the range of up to about 20%, or in some embodiments, in the range of up to about 10%, or in the range of about 1 to about 8%, or in the range of about 2 to about 7% by weight of the total weight of the composition (binding agent plus any additional components). Additionally, in some embodiments, the HEDTA used in creating the binding agent can be present in the composition in range of up to about 93%, or in the range of about 5 to about 40%, or in the range of about 7.5% to about 25% by weight of the total weight of the composition (binding agent plus any additional components).

In general, the binding agent can be created by combining the water and HEDTA components (and any additional functional components) and allowing the components to interact and solidify. As this material solidifies, a binder composition can form to bind and solidify the components. At least a portion of the ingredients associate to form the binder while the balance of the ingredients forms the remainder of the solid composition.

In some embodiments, at least some of the optional functional materials that may be included are substantially free of a component that can compete with the HEDTA for water and interfere with solidification. For example, one common interfering material may include a source of alkalinity. In at least some embodiments, the composition includes less than a solidification interfering amount of a component that can compete with the HEDTA for water and interfere with solidification.

With this in mind for the purpose of this patent application, water recited in these claims relates primarily to water added to the composition that primarily associates with the binder comprising at least a fraction of the HEDTA in the composition and the water. A chemical with water of hydration that is added into the process or products of this invention wherein the hydration remains associated with that chemical (does not dissociate from the chemical and associate with another) is not counted in this description of added water to form the binding agent. It should also be understood, however, that some embodiments may contain an excess of water that does not associate with the binder, for example, to facilitate processing of the composition prior to or during solidification.

Solid or aggregate compositions and methods embodying the invention are suitable for preparing a variety of solid compositions, as for example, a cast, extruded, molded or formed solid pellet, block, tablet, powder, granule, flake, and the like, or the formed solid or aggregate can thereafter be ground or formed into a powder, granule, flake, and the like. In some embodiments, the solid composition can be formed to have a weight of 50 grams or less, while in other embodiments, the solid composition can be formed to have a weight of 50 grams or greater, 500 grams or greater, or 1 kilogram or greater. For the purpose of this application the term "solid block" includes cast, formed, or extruded materials having a weight of 50 grams or greater. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The resulting solid composition can be used in any or a broad variety of applications, depending at least somewhat upon the particular functional materials incorporated into the composition. For example, in some embodiments, the solid composition may provide for a cleaning composition wherein a portion of the solid composition may be dissolved, for example, in an aqueous or other medium, to create a concentrated and/or use cleaning solution. The cleaning solution may be directed to a storage reservoir for later use and/or dilution, or may be applied directly to a point of use.

Solid compositions embodying the invention can be used in a broad variety of cleaning and destaining applications. Some examples include machine and manual warewashing, vehicle cleaning and care applications, presoaks, laundry and textile cleaning and destaining, carpet cleaning and destaining, surface cleaning and destaining, kitchen and bath cleaning and destaining, floor cleaning and destaining, cleaning in place operations, general purpose cleaning and destaining, industrial or household cleaners, pest control agents; or the like, or other applications.

Additional Functional Materials

As indicated above, the binder agent can be used to form a solid composition that may contain other functional materials that provide the desired properties and functionality to the solid composition. For the purpose of this application, the term "functional materials" include a material that when dispersed or dissolved in a use and/or concentrate solution, such as an aqueous solution, provides a beneficial property in a particular use. Examples of such a functional material include chelating/sequestering agents; inorganic detergents or alkaline sources; organic detergents, surfactants or cleaning agents; rinse aids; bleaching agents; sanitizers/anti-microbial agents; activators; detergent builders or fillers; defoaming agents, anti-redeposition agents; optical brighteners; dyes/odorants; secondary hardening agents/solubility modifiers; pesticides and/or baits for pest control applications; or the like, or a broad variety of other functional materials, depending upon the desired characteristics and/or functionality of the composition. In the context of some embodiments disclosed herein, the functional materials, or ingredients, are optionally included within the solidification matrix for their functional properties. The binding agent acts to bind the matrix, including the functional materials, together to form the solid composition. Some more particular examples of functional materials are discussed in more detail below, but it should be understood by those of skill in the art and others that the particular materials discussed are given by way of example only, and that a broad variety of other functional materials may be used. For example, many of the functional materials discussed below relate to materials used in cleaning and/or destaining applications, but it should be understood that other embodiments may include functional materials for use in other applications.

Chelating/Sequestering Agent

The solid composition may optionally include one or more chelating/sequestering agent as a functional ingredient. A chelating/sequestering may include, for example an aminocarboxylic acid, a condensed phosphate, a phosphonate, a polyacrylate, and the like. In general, a chelating agent is a molecule capable of coordinating (i.e., binding) the metal ions commonly found in natural water to prevent the metal ions from interfering with the action of the other detersive ingredients of a cleaning composition. The chelating/sequestering agent may also function as a threshold agent when included in an effective amount. In some embodiments, a solid cleaning composition can include in the range of up to about 70 wt. %, or in the range of about 5-60 wt. %, of a chelating/sequestering agent.

Some example of aminocarboxylic acids include, N-hydroxyethyliminodiacetic acid, nitrilotriacetic acid (NTA), ethylenediaminetetraacetic acid (EDTA), N-hydroxyethyl-ethylenediaminetriacetic acid (HEDTA) (in addition to the HEDTA used in the binder), diethylenetriaminepentaacetic acid (DTPA), and the like.

Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

The composition may include a phosphonate such as 1-hydroxyethane-1,1-diphosphonic acid $CH_3C(OH)[PO(OH)_2]_2$; aminotri(methylenephosphonic acid) $N[CH_2 PO(OH)_2]_3$; aminotri(methylenephosphonate), sodium salt $O^+Na^-$
|
$POCH_2N[CH_2PO(ONa)_2]_2$
|
OH 2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3 Na_xO_{15}P_5$ (x=7); hexamethylenediamine(tetramethylenephosphonate), potassium salt $C_{10} H_{(28-x)}N_2K_xO_{12}P_4$ (x=6); bis(hexamethylene) triamine(pentamethylenephosphonic acid) $(HO_2)POCH_2N[(CH_2)_6N[CH_2PO(OH)_2]_2]_2$; and phosphorus acid $H_3PO_3$. embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

Some examples of polymeric polycarboxylates suitable for use as sequestering agents include those having a pendant carboxylate ($—CO_2$) group and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Inorganic Detergents or Alkaline Sources

A solid composition, such as a solid cleaning composition, produced according to some embodiments may include effective amounts of one or more alkaline sources to, for example, enhance cleaning of a substrate and improve soil removal performance of the composition. The alkaline matrix is bound into a solid due to the presence of the binder composition including HEDTA and water. A metal carbonate such as sodium or potassium carbonate, bicarbonate, sesquicarbonate, mixtures thereof and the like can be used. Suitable alkali metal hydroxides include, for example, sodium or potassium hydroxide. An alkali metal hydroxide may be added to the composition in the form of solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 50 wt % and a 73 wt % solution. Examples of useful alkaline sources include a metal silicate such as sodium or potassium silicate (for example, with a $M_2O:SiO_2$ ratio of about 1:2.4 to about 5:1, M representing an alkali metal) or metasilicate; a metal borate such as sodium or potassium borate, and the like; ethanolamines and amines; and other like alkaline sources. In some embodiments, the composition can include in the range of up to about 80 wt. %, or in the range of about 1-70 wt. %, or in some embodiments, in the range of about 5-60 wt. % of an alkaline source.

Organic Detergents, Surfactants or Cleaning Agents

The composition can optionally include at least one cleaning agent such as a surfactant or surfactant system. A variety of surfactants can be used, including anionic, nonionic, cationic, and zwitterionic surfactants, which are commercially available from a number of sources. In some embodiments, anionic and nonionic agents are used. For a discussion of surfactants, see Kirk-Othmer, Encyclopedia of Chemical Technology, Third Edition, volume 8, pages 900-912, which is incorporated herein by reference. In some embodiments, the cleaning composition comprises a cleaning agent in an amount effective to provide a desired level of cleaning, in some embodiments in the range of up to about 20 wt. %, or in some embodiments, in the range of about 1.5 to about 15 wt. %.

Some anionic surfactants useful in cleaning compositions, include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates, alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. Some particular anionics are sodium alkylarylsulfonate, alpha-olefinsulfonate, and fatty alcohol sulfates.

Nonionic surfactants useful in cleaning compositions include those having a polyalkylen oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkyle oxide free nonionics such as alkyl polyglycosides; sorbitan and sucrose esters and their ethoxylates; alkoxylated ethylene diamine; alcohol alkoxylates such as alcohol ethyoxylate propoxylates, alcohol propoxylates, alcohol ethoxylate butoxylates, and the like, nonylphenol ethoxylate, polyoxyethylene glycol ethers and the like; carboxylic acid esters such as glycerol esters, polyoxyethyle esters, ethoxylated and glycol esters of fatty acids, and the like, carboxylic amides such as diethanolamine condensates, monoalkanolamine condensates, polyoxyethylene fatty acid amides, and the like; and polyalkyle oxide block copolymers including an ethylene oxide/propylene oxide block copolymer such as those commercially available under the trademark PLURONIC (BASF-Wyandotte), and the like; and other like nonionic compounds. Silicone surfactants such as ABIL B8852 can also be used.

Cationic surfactants useful for inclusion in a cleaning composition for sanitizing or fabric softening include amines such as primary, secondary and tertiary monoamines with $C_{18}$ alkyl or alkenyl chains, ethoxylated alkiamines, alkoxylates of ethylenediamine, imidazoles such as a 1 -(2-hydroxyethyl)-2-imidazoline, a 2-alkyl- 1-(2-hydroxyethyl)-2-imidazoline, and the like; and the quatemary ammonium salts, as for example, alkylquatemary animonium chloride surfactants such as n-alkyl($C_{12}$-$C_{18}$) dimethylbenzyle ammonium chloride, n-tetradecyldimethylbenzylammonium chloride monohydrate, a naphthalene═substituted quaternary ammonium chloride such as dimethyl-1-naphthylmethylammonium chloride, and the like; and other like cationic surfactants.

Rinse Aids

The composition can optionally include a rinse aid composition, for example, a rinse aid formulation containing a wetting or sheeting agent combined with other optional ingredients in a solid composition made using the binding agent. The rinse aid components of a solid rinse aid can be a water soluble or dispersible low foaming organic material capable of reducing the surface tension of the rinse water to promote sheeting actin and/or to prevent spotting or streaking caused by beaded water after rinsing is complete, for example in warewashing processes. Such sheeting agents are typically organic surfactant like materials having a characteristic cloud point. The cloud point of the surfactant rinse or sheeting agent is defined as the temperature at which a 1 wt. % aqueous solution of the surfactant turns cloudy when warmed. Since there are two general types of rinse cycles in commercial warewashing machines, a first type generally considered a sanitizing rinse cycle uses rinse water at a temperature in the range of about 180° F. to about 80° C., or higher. A second type of non-sanitizing machine uses a lower temperature non-sanitizing rinse, typically at a temperature in the range of about 125° F. to about 50° C., or higher. Surfactants useful in these applications are aqueous rinses having a cloud point greater than the available hot service water. Accordingly, the lowest cloud point measured for the surfactants can be approximately 40° C. The cloud point can also be 60° C. or higher, 70° C. or higher, 80° C. or higher, etc., depending on the use locus hot water temperature and the temperature and type of rinse cycle. Some example sheeting agents can typically comprise a polyether compound prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. Such sheeting agents can have a molecular weight in the range of about 500 to 15,000. Certain types of (PO)(EO) polymeric rinse aids have been found to be useful containing at least one block of poly(PO) and at least one block of poly(EO) in the polymer molecule. Additional blocks of poly(EO), poly(PO) or random polymerized regions can be formed in the molecule. Particularly useful polyoxypropylene polyoxyethylene block copolymers are those comprising a center block of polyoxypropylene units and blocks of polyoxyethylene units to each side of the center block. Such polymers have the formula shown below:

$$(EO)_n\text{-}(PO)_m\text{-}(EO)_n$$

wherein m is an integer of 20 to 60, and each end (n) is independently an integer of 10 to 130. Another useful block copolymer are block copolymers having a center block of polyoxyethylene units and blocks of polyoxypropylene to each side of the center block. Such copolymers have the formula:

$$(PO)_n\text{-}(EO)_m\text{-}(PO)_n$$

wherein m is an integer of 15 to 175, and each end (n) is independently an integer of about 10 to 30. The solid functional materials can often use a hydrotrope to aid in maintaining the solubility of sheeting or wetting agents. Hydrotropes can be used to modify the aqueous solution creating increased solubility for the organic material. In some embodiments, hydrotropes are low molecular weight aromatic sulfonate materials such as xylene sulfonates and dialkyldiphenyl oxide sulfonate materials.

Bleaching Agents

The composition can optionally include a bleaching agent. Bleaching agents can be used for lightening or whitening a substrate, and can include bleaching compounds capable of liberating an active halogen species, such as $CI_2$, $Br_2$, —$OCI^-$ and/or —$Obr^-$, or the like, under conditions typically encountered during the cleansing process. Suitable bleaching agents for use can include, for example, chlorine-containing compounds such as a chlorine, a hypochlorite, chloramines, or the like. Some examples of halogen-releasing compounds include the alkali metal dichloriosocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compounds include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A cleaning composition may include a minor but effect amount of a bleaching agent, for example, in some embodiments, in the range of up to about 10 wt. %, and in some embodiments, in the range of about 0.1 to about 6 wt. %.

Sanitizers/Anti-Microbial Agents

The composition can optionally include a sanitizing agent. Sanitizing agents also known as antimicrobial agents are chemical compositions that can be used in a solid functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of the microbe or may destroy all or a portion of the microbial population. The terms “microbes” and “microorganisms” typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Some examples of common antimicrobial agents include phenolic antimicrobials such as pentachlorophenol, orthophenylphenol, a chloro-p-benzylphenol, p-chlor-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quatemary antimicrobial agents such as benzalkonium chloride, didecyldimethyl ammonium chloride, choline diiodochloride, tetramethyl phosphonium tribromide. Other antimicrobial compositions such as hexahydro-1, 3, 5-tris(2-hydroxyethyl)-s- -triazine, dithiocarbamates such as sodium dimethyldithiocarbamate, and a variety of other materials are known in the art for their antimicrobial properties. In some embodiments, the cleaning composition comprises sanitizing agent in an amount effective to provide a desired level of sanitizing. In some embodiments, an antimicrobial component, such as TAED can be included in the range of up to about 75 % by wt. Of the composition, in some embodiments in the range of up to about 20 wt. %, or in some embodiments, in the range of about 0.01 to about 20 wt. %, or in the range of 0.05 to 10% by wt of the composition.

Activators

In some embodiments, the antimicrobial activity or bleaching activity of the composition can be enhanced by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of up to about 75% by wt. Of the composition, in some embodiments, in the range of about 0.01 to about 20% by wt. of the composition, or in some embodiments, in the range of about 0.05 to 10% by wt. of the composition. In some embodiments, an activator for an active oxygen compound combines with the active oxygen to form an antimicrobial agent.

In some embodiments, the composition includes a solid block and an activator material for where the active oxygen is coupled to the solid block. The activator can be coupled to the solid block by any of a variety of methods for coupling one solid cleaning composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the cleaning composition, such as a plastic or shrink wrap or film.

Detergent Builders or Fillers

The composition can optionally include a minor but effective amount of one or more of a detergent filler which does not necessarily perform as a cleaning agent per se, but may cooperate with a cleaning agent to enhance the overall cleaning capacity of the composition. Some examples of suitable fillers may include sodium sulfate, sodium chloride, starch, sugars, $C_1$-$C_{10}$ alkylene glycols such as propylene glycol, and the like. In some embodiments, a detergent filler can be included in an amount in the range of up to about 20 wt. %, and in some embodiments, in the range of about 1-15 wt. %.

Defoaminig Agents

The composition can optionally include a minor but effective amount of a defoaming agent for reducing the stability of foam. In some embodiments, the composition may include in the range of up to about 5 wt. % of a defoaming agent, and in some embodiments, in the range of about 0.0001 to about 3 wt. %.

Some examples of suitable defoaming agents may include silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, alkyl phosphate esters such as monostearyl phosphate, and the like. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agents

The composition can optionally include an anti-redeposition agent capable of facilitating sustained suspension of soils in a cleaning solution and preventing the removed soils from being redeposited onto the substrate being cleaned. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition may include up to about 10 wt. %, and in some embodiments, in the range of about Ito about 5 wt. %, of an anti-redeposition agent.

Optical Brighteners

The composition can optionally include an optical brightener. An optical brightener is also referred to as fluorescent whitening agents or fluorescent brightening agents and can provide optical compensation for the yellow cast in fabric substrates. With optical brighteners, yellowing is replaced by light emitted from optical brighteners present in the area commensurate in scope with yellow color. The violet to blue light supplied by the optical brighteners combines with other light reflected from the location to provide a substantially complete or enhanced bright white appearance. This additional light is produced by the brightener through fluorescence. Optical brighteners absorb light in the ultraviolet range 275 through 400 nm. and emit light in the ultraviolet blue spectrum range 400-500 nm.

Fluorescent compounds belonging to the optical brightener family are typically aromatic or aromatic heterocyclic materials often containing a condensed ring system. A feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) Or six membered heterocycles (cumarins, naphthalamides, triazines, etc.). The choice of optical brighteners for use in compositions will depend upon a number of factors, such as the type of composition, the nature of other components present in the composition, the temperature of the wash water, the degree of agitation, and the ratio of the material washed to the tub size. The brightener selection is also dependent upon the type of material to be cleaned, e.g., cottons, synthetics, etc. Since most laundry detergent products are used to clean a variety of fabrics, the detergent compositions may contain a mixture of brighteners which are effective for a variety of fabrics. It is of course necessary that the individual components of such a brightener mixture be compatible.

Examples of useful optical brighteners are commercially available and will be appreciated by those skilled in the art. At least some commercial optical brighteners can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles and other miscellaneous agents. Examples of these types of brighteners are disclosed in "The Production and Application of Fluorescent Brightening Agents", M. Zahradnik, Published by John Wiley & Sons, New York (1982), the disclosure of which is incorporated herein by reference.

Stilbene derivatives which may be useful include, but are not necessarily limited to, derivatives of bis(triazinyl)amino-stilbene; bisacylamino derivatives of stilbene; triazole derivatives of stilbene; oxadiazole derivatives of stilbene; oxazole derivatives of stilbene; and styryl derivatives of stilbene.

Dyes/Odoratits

Various dyes and/or odorants including perfumes, and other aesthetic enhancing agents may also be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis) Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellol, aldehydes such as amyl cinnamaldehyde, a jasmine such as C1S-jasmine or jasmal, vanillin, and the like.

Secondary Hardening Agents/Solubility Modifiers

A composition may include a minor but effective amount of a secondary hardening agent, as for example, an amide such as stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the cleaning agent and/or other active ingredients may be dispensed from the solid composition over an extended period of time. The composition may include a secondary hardening agent in an amount in the range of up to about 20 wt.%, or in some embodiments, in the range of about 5 to about 15 wt.%.

Pest Control Agents

In compositions intended for use in pest control applications, and an effective amount of pest control agents, such as pesticide, attractant, and/or the like may be included. A pesticide is any chemical or biological agent used to kill pests such as, for example, insects, rodents, and the like. A pesticide can include an insecticide, rodenticide, and the like. Rodenticides include, for example, difethialone, bromadiolone, brodifacoum, or mixtures thereof. An attractant and/or bait can be any substance that attracts the pest to the composition. The attractant can be a food, scent, or other sensory stimulant. The attract can be grain-based, such as, corn, oats, or other animal feed such as, dog, cat or fish food.

In some embodiments, the pesticide and/or attractant and/or both may be present in the composition at any desired effective amount, for example, in the range of up to about 99 wt %, or in the range of about 0.01 to about 90 wt %, or in the range of about 1 to about 50 wt % based on the total weight of the solid composition.

Other Ingredients

A wide variety of other ingredients useful in providing the particular composition being formulated to include desired properties or functionality may also be included. For example, the compositions, may include other active ingredients, pH buffers, cleaning enzymes, carriers, processing aids, solvents for liquid formulations, or others, and the like.

Additionally, the composition can be formulated such that during use in aqueous operations, for example in aqueous cleaning operations, the wash water will have a desired pH. For example, compositions designed for use in providing a presoak composition may be formulated such that during use in aqueous cleaning operations the wash water will have a pH in the range of about 6.5 to about 11, and in some embodiments, in the range of about 7.5 to about 10.5. Liquid product formulations in some embodiments have a (10% dilution) pH in the range of about 7.5 to about 10.0, and in some embodiments, in the range of about 7.5 to about 9.0. Techniques for controlling pH at recommended usage levels include the use of buffers, alkali, acids, etc., and are well known to those skilled in the art.

Aqueous Medium

The ingredients may optionally be processed in a minor but effective amount of an aqueous medium such as water to achieve a homogenous mixture, to aid in the solidification; to provide an effective level of viscosity for processing the mixture, and to provide the processed composition with the desired amount of firmness and cohesion during discharge and upon hardening. The mixture during processing typically comprises in the range of about 0.2 to about 12 wt. % of an aqueous medium, and in some embodiments, in the range of about 0.5 and about 10 wt. %.

The unique binding agent of the invention can be used to form solid functional materials other than cleaning compositions. For example, the active ingredients in sanitizing agents, rinse agents, aqueous lubricants, and other functional materials can be formed in a solid format using the binding agents of the invention. Such materials are combined with sufficient amounts of HEDTA and water to result in a stable solid block material.

Processing of the Composition

The invention also relates to a method of processing and/or making a solid composition, such as a solid cleaning composition. The components of the binder agent and optional other ingredients are mixed with an effective solidifying amount of ingredients. A minimal amount of heat may be applied from an external source to facilitate processing of the mixture.

A mixing system provides for continuous mixing of the ingredients at high shear to form a substantially homogeneous liquid or semi-solid mixture in which the ingredients are distributed throughout its mass. Preferably, the mixing system includes means for mixing the ingredients to provide shear effective for maintaining the mixture at a flowable consistency, with a viscosity during processing of about 1,000-1,000,000 cP, preferably about 50,000-200,000 cP. In some example embodiments, the mixing system can be a continuous flow mixer or in some embodiments, a single or twin screw extruder apparatus.

The mixture is typically processed at a temperature to maintain the physical and chemical stability of the ingredients. In some embodiments, the mixture is processed at ambient temperatures in the range of about 20° C. to about 80° C., or in some embodiments, in the range of about 25° C. to about 55° C. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the cleaning agent, the aqueous medium, and additional ingredients such as a second cleaning agent, a detergent adjuvant or other additive, a secondary hardening agent, and the like. One or more premixes may be added to the mixture.

The ingredients are mixed to form a substantially homogeneous consistency wherein the ingredients are distributed substantially evenly throughout the mass. The mixture is then discharged from the mixing system through a die or other shaping means. The profiled extrudate then can be divided into useful sizes with a controlled mass. In some embodiments, the extruded solid is packaged in film. The temperature of the mixture when discharged from the mixing system can be sufficiently low to enable the mixture to be cast or extruded directly into a packaging system without first cooling the mixture. The time between extrusion discharge and packaging may be adjusted to allow the hardening of the composition for better handling during further processing and packaging. In some embodiments, the mixture at the point of discharge is in the range of about 20° C. to about 90° C., or in some embodiments, in the range of about 25° C. to about 55° C. The composition is then allowed to harden to a solid form that may range from a low density, sponge-like, malleable, caulky consistency to a high density, fused solid, concrete-like solid.

Optionally, heating and cooling devices may be mounted adjacent to a mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. In some embodiments, the temperature of the mixture during processing, including at the discharge port, is maintained in the range of about 20° C. to about 90 C.

When processing of the ingredients is completed, the mixture may be discharged from the mixer through a discharge die. The composition eventually hardens due to the chemical reaction of the ingredients forming the binder agent. The solidification process may last from a few minutes to about six hours, or more, depending, for example, on the size of the cast or extruded composition, the ingredients of the composition, the temperature of the composition, and other like factors. In some embodiments, the cast or extruded composition "sets up" or begins to harden to a solid form within about 1 minute to about 3 hours, or in the range of about 1 minute to about 2 hours, or in some embodiments, within about 1 minute to about 20 minutes.

Packaging System

The composition can be, but is not necessarily, incorporated into a packaging system or receptacle. The packaging receptacle or container may be rigid or flexible, and include any material suitable for containing the compositions produced, as for example glass, metal, plastic film or sheet, cardboard, cardboard composites, paper, or the like.

Advantageously, in at least some embodiments, since the composition is processed at or near ambient temperatures, the temperature of the processed mixture is low enough so that the mixture may be cast or extruded directly into the container or other packaging system without structurally damaging the material. As a result, a wider variety of materials may be used to manufacture the container than those used for compositions that are processed and dispensed under molten conditions. In some embodiments, the packaging used to contain the compositions is manufactured from a flexible, easy opening film material.

Dispensing of the Processed Compositions

The composition, such as a cleaning composition, can be dispensed from a spray-type dispenser such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. Briefly, a spray-type dispenser functions by impinging a water spray upon an exposed surface of the solid composition to dissolve a portion of the composition, and then immediately directing the concentrate solution comprising the composition out of the dispenser to a storage reservoir or directly to a point of use. An example of a particular product shape is shown in FIG. 9 of U.S. patent application No. 6,258,765, which is incorporated herein by reference. When used, the product is removed from the package (e.g.) film (if any) and is inserted into the dispenser. The spray of water can be made by a nozzle in a shape that conforms to the solid shape of the composition. The dispenser enclosure can also closely fit the shape in a dispensing system that prevents the introduction and dispensing of an incorrect composition.

The above description provides a basis for understanding the broad meets and bounds of the invention. The following examples and test data provide an understanding of certain specific embodiments of the invention. The invention will be further described by reference to the following detailed examples. These examples are not meant to limit the scope of the invention. Variation within the concepts of the invention are apparent to those skilled in the art.

EXAMPLES

Example 1

Composition Including Binding Agent Including HEDTA and Water

In this example, a solid cleaning composition was formed including a binding agent formed with HEDTA and water. The solid cleaning composition also included additional functional ingredients. The formulation was made using the components and weight percentages given in Table 1:

TABLE 1

Formulation including HEDTA

| Component Number | Component Name | Form of Raw Material | Wt. % |
|---|---|---|---|
| 1 | soft water | liquid | 6 |
| 2 | linear alcohol C9-C11 | liquid | 2 |
| 3 | linear alcohol 60-70% | liquid | 2 |
| 4 | Sodium tripolyphosphate (low density) | powder | 25 |
| 5 | Sodium silicate | powder | 5 |
| 6 | LAS flake 90% | powder | 6 |
| 7 | HEDTA | powder | 54 |
| Total | | | 100 |

To create the formulation, components 4, 5, 6, and 7 were admixed in order. Thereafter item 1 was added, and the combination was mixed until it was uniform. Then, item 2 was added, and the combination was mixed until it was uniform, and item 3 was added and mixed until the combination was uniform. Then, 20 to 25 grams of the formulation was placed in a specimen cup, and compressed. The formulation hardened when pressed into the specimen cup to form a solid composition. This particular cleaning composition may be useful, for example, for hard surface cleaning applications.

Example 2

Comparative Formulation Substituting EDTA for the HEDTA of Formulation 1

In this example, an attempt was made to create a solid cleaning composition similar to that shown above in Example 1, but substituting EDTA for the HEDTA component. The formulation was made using the components and weight percentages given in Table 2:

TABLE 2

Formulation 2 (including EDTA)

| Component Number | Raw Material Name | Form of Raw Material | Wt. % |
|---|---|---|---|
| 1 | soft water | liquid | 6 |
| 2 | linear alcohol C9-C11 | liquid | 2 |
| 3 | linear alcohol 60-70% | liquid | 2 |
| 4 | Sodium tripolyphosphate (low density) | powder | 25 |
| 5 | Sodium silicate | powder | 5 |
| 6 | LAS flake 90% | powder | 6 |
| 7 | EDTA | powder | 54 |
| Total | | | 100 |

The formulation was created using the same admixing of components as discussed above in Example 1, but the EDTA was substituted for the HEDTA. 20 to 25 grams of the formulation was placed in a specimen cup, and compressed. The formulation did not harden when pressed into the specimen cup, and did not form a solid composition.

Example 3

Additional Examples of Solid Compositions Including a Binding Agent Formed From HEDTA and Water In this example, 7 formulations, including a Control Formulation and Formulations A through F, were used to create solid cleaning compositions. The formulations were made using the components in the amounts given below in Table 3:

TABLE 3

| | Control | | A | | B | | C | | D | | E | | F | |
|---|---|---|---|---|---|---|---|---|---|---|---|---|---|---|
| Components | Wt. % | Wt. (g) | Wt. % | Wt. (g) | Wt. % | Wt. (g) | Wt. % | Wt. (g) | Wt. % | Wt. (g) | Wt. % | Wt. (g) | Wt. % | Wt. (g) |
| Ash (sodium carbonate) | 0 | 0 | 25 | 12.5 | 0 | 0 | 0 | 0 | 0 | 0 | 0 | 0 | 0 | 0 |
| Water (soft) | 6 | 3 | 6 | 3 | 8 | 4 | 7.9 | 3.95 | 3.92 | 1.96 | 4.45 | 2.23 | 7.78 | 3.89 |
| linear alcohol (linear C9-C11 alcohol 6 mole) | 2 | 1 | 2 | 1 | 2.65 | 1.33 | 2.6 | 1.33 | 1.3 | 0.65 | 2.77 | 1.39 | 1.11 | 0.56 |
| linear alcohol (60-70%) | 2 | 1 | 2 | 1 | 2.65 | 1.33 | 2.6 | 1.33 | 1.3 | 0.65 | 2.77 | 1.39 | 1.11 | 0.56 |
| Sodium tripoly-phosphate, (low density, anhydrous) | 25 | 12.5 | 0 | 0 | 0 | 0 | 32.5 | 16.3 | 16.3 | 8.15 | 34.7 | 17.4 | 13.9 | 6.95 |
| HEDTA (Na3 Powder) | 54 | 27 | 54 | 27 | 72 | 36 | 40 | 20 | 70 | 35 | 40 | 20 | 70 | 35 |

TABLE 3-continued

| Components | Control Wt. % | Control Wt. (g) | A Wt. % | A Wt. (g) | B Wt. % | B Wt. (g) | C Wt. % | C Wt. (g) | D Wt. % | D Wt. (g) | E Wt. % | E Wt. (g) | F Wt. % | F Wt. (g) |
|---|---|---|---|---|---|---|---|---|---|---|---|---|---|---|
| sodium silcate | 5 | 2.5 | 5 | 2.5 | 6.7 | 3.35 | 6.5 | 3.25 | 3.26 | 1.63 | 6.93 | 3.47 | 2.78 | 1.39 |
| LAS 90% flake (linear alkylate sulfonate) | 6 | 3 | 6 | 3 | 8 | 4 | 7.9 | 3.95 | 3.92 | 1.63 | 8.42 | 4.21 | 3.33 | 1.67 |
| Total | 100 | 50 | 100 | 50 | 100 | 50 | 100 | 50 | 100 | 50 | 100 | 50 | 100 | 50 |
| HEDTA/$H_20$ by weight | 9 | | 9 | | 9 | | 5.06 | | 17.9 | | 8.99 | | 9 | |
| HEDTA/$H_20$ by moles | 0.47 | | 0.47 | | 0.47 | | 0.27 | | 0.93 | | 0.47 | | 0.47 | |

To create the formulations, the sodium tripolyphosphate (if any), sodium silicate, LAS 90% flake, ash (if any), and HEDTA components were admixed in order. Thereafter, the water was added, and the combination was mixed until it was uniform. Then, the linear alcohol (linear C9-C11 alcohol 6 mole) was added, and the combination was mixed until it was uniform, and the linear alcohol (60-70%) was added and mixed until the combination was uniform. Then, 20 to 25 grams of the formulation was placed in a specimen cup, and compressed. The formulation hardened when pressed into the specimen cup to form a solid composition. These particular cleaning compositions may be useful, for example, for hard surface cleaning applications.

After formation of the solid compositions, the following initial observations were made: All of the formulations produced a solid tablet. The control formulation and formulations A and E produced a hard tablet with some surface cracking. Formulation B produced a hard tablet with some surface cracking, but that was a little more tacky than the control. Formulation C produced a solid tablet that had larger particle size during mixing, and was somewhat softer than the control, but had no surface cracking. Formulation D produced a solid tablet that was a little harder and dryer than the control, and was easier to break than the control. Formulation F produced a hard tablet with no surface cracking.

One day after extruding the tablets using the formulations listed above, penetrometer readings were taken on some of the samples using a Precision Scientific 626A penetrometer with 150g weights on the needle. The tablets were tested by deflecting the unit for five seconds, and then measuring the penetration value. A value of 1 indicates a penetration of 0.1 millimeters. These penetrometer readings indicate solidification and the formation of a hard tablet. The results ar shown in Table 4.

TABLE 4

| Formulation | Penetrometer Reading |
|---|---|
| Control | 1 |
| A | 1 |
| B | 1 |
| C | 1 |
| D | na |
| E | 1 |
| F | 1 |

Example 4

Additional Formulations Including a Binding Agent Formed with HEDTA and Water In this example, a series of formulations were used in an attempt to create solid cleaning compositions including a binding agent formed with HEDTA and water. The solid cleaning compositions also included additional functional ingredients. The formulations used included a control formulation, and formulations A1 through N1, the components and weight percentages of which given in Tables 5, 6, 7 and 8:

TABLE 5

| Component Number | Component name | Control Wt. % | A1 Wt. % | A1 Wt. (g) | B1 Wt. % | B1 Wt. (g) | C1 Wt. % | C1 Wt. (g) |
|---|---|---|---|---|---|---|---|---|
| 1 | water | 6 | 5 | 1 | 5 | 1 | 10 | 2 |
| 2 | linear alcohol C9-C11 | 2 | 2 | 0.4 | 2 | 0.4 | 4.5 | 0.9 |
| 3 | linear alcohol 60-70% | 2 | 2 | 0.4 | 2 | 0.4 | 4.5 | 0.9 |
| 4 | Sodium tri-polyphosphate (low density) | 25 | 50 | 10 | 60 | 12 | 60 | 12 |
| 5 | HEDTA | 54 | 30 | 6 | 20 | 4 | 10 | 2 |
| 6 | Sodium silicate | 5 | 5 | 1 | 5 | 1 | 5 | 1 |
| 7 | LAS flake 90% | 6 | 6 | 1.2 | 6 | 1.2 | 6 | 1.2 |
| | Total | 100 | 100 | 20 | 100 | 20 | 100 | 20 |
| | HEDTA/H20 by wt. | 9 | 6 | | 4 | | 1 | |
| | HEDTA/H20 by moles | | 0.31 | | 0.21 | | 0.05 | |

TABLE 6

| Component Number | Component Name | D1 Wt. % | D1 Wt. % | E1 Wt. (g) | E1 Wt. % | F1 Wt. (g) | F1 Wt. % |
|---|---|---|---|---|---|---|---|
| 1 | water | 10 | 2 | 10 | 2 | 5 | 1 |
| 2 | linear alcohol C9-C11 | 4.5 | 0.9 | 4.5 | 0.9 | 2 | 0.4 |
| 3 | linear alcohol 60-70% | 4.5 | 0.9 | 4.5 | 0.9 | 2 | 0.4 |
| 4 | Sodium tri-polyphosphate (low density) | 55 | 11 | 52.5 | 10.5 | 58.5 | 11.7 |
| 5 | HEDTA | 15 | 3 | 17.5 | 3.5 | 17.5 | 3.5 |
| 6 | Sodium silicate | 5 | 1 | 5 | 1 | 7 | 1.4 |
| 7 | LAS flake 90% | 6 | 1.2 | 6 | 1.2 | 8 | 1.6 |
| | Total | 100 | 20 | 100 | 20 | 100 | 20 |
| | $HEDTA/H_20$ by wt. | 1.5 | | 1.75 | | 3.5 | |
| | $HEDTA/H_20$ by moles | 0.08 | | 0.09 | | 0.18 | |

TABLE 7

| Component Number | Component Name | G1 Wt. % | G1 Wt. (g) | H1 Wt. % | H1 Wt. (g) | I1 Wt. (g) | I1 Wt. (g) |
|---|---|---|---|---|---|---|---|
| 1 | water | 5 | 1 | 5 | 1 | 5 | 1 |
| 2 | linear alcohol C9-C11 | 2 | 0.4 | 2 | 0.4 | 2 | 0.4 |
| 3 | linear alcohol 60-70% | 2 | 0.4 | 2 | 0.4 | 2 | 0.4 |
| 4 | Sodium tri-polyphosphate (low density) | 61 | 12.2 | 66 | 13.2 | 68.5 | 13.7 |
| 5 | HEDTA | 15 | 3 | 10 | 2 | 7.5 | 1.5 |
| 6 | Sodium silicate | 7 | 1.4 | 7 | 1.4 | 7 | 1.4 |
| 7 | LAS flake 90% | 8 | 1.6 | 8 | 1.6 | 8 | 1.6 |
| | Total | 100 | 20 | 100 | 20 | 100 | 20 |
| | $HEDTA/H_20$ by wt | 3 | | 2 | | 1.5 | |
| | $HEDTA/H_20$ by moles | 0.16 | | 0.10 | | 0.08 | |

TABLE 8

| Component Number | Component Name | J1 Wt. % | J1 Wt. (g) | K1 Wt. % | K1 Wt. % | L1 Wt. (g) | L1 Wt. % | M1 Wt. (g) | M1 Wt. (g) | N1 Wt. % | N1 Wt. (g) |
|---|---|---|---|---|---|---|---|---|---|---|---|
| 1 | water | 5 | 1 | 5 | 1 | 5 | 1 | 6 | 1.2 | 5 | 1 |
| 2 | linear alcohol C9-C11 | 2 | 0.4 | 2 | 0.4 | 2 | 0.4 | 2 | 0.4 | 1 | 0.2 |
| 3 | linear alcohol 60-70% | 2 | 0.4 | 2 | 0.4 | 2 | 0.4 | 2 | 0.4 | 1 | 0.2 |
| 4 | Sodium tri-polyphosphate (low density) | 64.5 | 12.9 | 62.5 | 12.5 | 63 | 1 | 0.2 | 12.6 | 1 | 0.2 |
| 5 | HEDTA | 7.5 | 1.5 | 7.5 | 1.5 | 5 | 1 | 85 | 17 | 90 | 18 |
| 6 | Sodium silicate | 7 | 1.4 | 7 | 1.4 | 7 | 1.4 | 2 | 0.4 | 1 | 0.2 |
| 7 | LAS flake 90% | 12 | 2.4 | 14 | 2.8 | 16 | 3.2 | 2 | 0.4 | 1 | 0.2 |
| | Total | 100 | 20 | 100 | 20 | 100 | 20 | 100 | 20 | 100 | 20 |
| | $HEDTA/H_20$ wt | 1.5 | | 1.5 | | 1 | | 14.2 | | 18 | |
| | $HEDTA/H_20$ moles | 0.08 | | 0.08 | | 0.05 | | 0.74 | | 0.94 | |

To create the formulations, components 4, 6, 7 and 5, were admixed in that order. Thereafter item 1 was added, and the combination was mixed until it was uniform. Then, item 2 was added, and the combination was mixed until it was uniform, and item 3 was added and mixed until the combination was uniform. Then, 20 to 25 grams of the formulation was placed in a specimen cup, and compressed.

The control, and formulations A1, B1, F1, G1, J1, K1, L1, M1, and N1 formed a solid tablet, while formulations C1, D1, E1, H1, and I1 did not harden in this particular experiment. For formulation J1, the tablet did break apart when popped out of the specimen cup at 24 hours, but it seemed dry and solid. For formulation K1, the tablet was popped out of the specimen cup and was dry, but somewhat soft. For formulation L1, the tablet was popped out of the specimen cup and was a little harder than K1, but was still somewhat soft. Formulation M1 produced a hard tablet when popped out of the specimen cup at 24 hours. Formulation N1 produced a hard tablet with some minor surface cracking when popped out of the specimen cup at 24 hours. These particular cleaning compositions may be useful, for example, for hard surface cleaning applications.

For formulations J1 through N1, initial temperature readings were taken prior to mixing the water into the formulation, and final temperature readings were taken after mixing the water into the formulations. The initial and final temperature readings are given in Table 9.

TABLE 9

| Formulation | J1 | K1 | L1 | M1 | N1 |
|---|---|---|---|---|---|
| Initial Temperature (° F.) | 91 | 91 | 91 | 81 | 71 |
| Final Temperature (° F.) | 85 | 85 | 85 | 85 | 83 |

These temperature readings may indicate the absence of a significant exothermic reaction during the formation of the solid binding agent in most embodiments tested.

Example 5

Extrusion of Formulations Including a Solid Binding Agent Formed from HEDTA and Water In this Example, three formulations (Formulations O through Q) were used to create solid compositions having an HEDTA/water binding agent through the use of an extrusion technique. The formulations were made using the components in the amounts given below in Table 10.

TABLE 10

| | Formulation | | | | | |
|---|---|---|---|---|---|---|
| | O | | P | | Q | |
| Components | Wt. %/min | Wt. in lb/min | Wt. %/min | Wt. in lb/min | Wt. %/min | Wt. in lb/min |
| HEDTA (Na3 Powder) | 7.5 | 0.0525 | 15 | 0.105 | 25 | 0.175 |
| Water (soft) | 5 | 0.035 | 4.6 | 0.0322 | 4.12 | 0.0288 |
| linear alcohol (linear C9-C11 alcohol 6 mole) | 2 | 0.014 | 1.8 | 0.0126 | 1.6 | 0.0112 |
| linear alcohol (60-70%) | 2 | 0.014 | 1.8 | 0.0126 | 1.6 | 0.0112 |
| Sodium tripoly-phosphate, (low density, anhydrous) | 68.5 | 0.4795 | 63 | 0.44121 | 55.32 | 0.3872 |
| sodium silcate | 7 | 0.049 | 6.47 | 0.04529 | 5.77 | 0.0404 |
| LAS 90% flake (linear alkylate sulfonate) | 8 | 0.056 | 7.3 | 0.0511 | 6.6 | 0.0462 |
| Total | 100 | 0.7 | 100 | 0.7 | 100 | 0.7 |
| $HEDTA/H_20$ wt. %/min | 1.5 | | 3.26 | | 6.07 | |
| $HEDTA/H_20$ moles/min. | 0.08 | | 0.17 | | 0.32 | |

The sodium tripoly-phosphate, sodium silcate, and LAS flake were premixed in a ribbon blender, and thereafter, the water, and the two linear alcohol components were added to the mixture in the blender, and mixed for ten minutes. The mixture was then added to a feeder that could feed the mixture to a first feed stream to the extruder at a rate of about 0.65 pounds per minute. The HEDTA component was added to a second feeder that could feed the HEDTA to a second feed stream to the extruder at a rate in the range of about 0.05 to about 0.2 pounds per minute such that the feed rate of the HEDTA could be changed.

Each of the formulations was created using a 30 millimeter Wemer-Pfleider extruder assembly. The two different feed streams fed into the extruder which included a series of conveying screws and one mixing screw near the end of the extruder. For formulation O, which included a feed rate of 7.5% HEDTA, the first feed stream was at a rate of 0.65 pounds per minute, and the second feed stream was set at a rate of 0.05 pounds per minute. For formulation P, which included a feet rate of 15% HEDTA, the first feed stream was at a rate of 0.65 pounds per minute, and the second feed stream was set at a rate of 0.10 pounds per minute. For formulations Q, which included a feed rate of 25% HEDTA, the first feed stream was at a rate of 0.65 pounds per minute, and the second feed stream was set at a rate of 0.18 pounds per minute. The extruder was set to run at 200 rpm. For each of the formulations, the feed streams were mixed in the extruder, and the mixed composition was conveyed out the end of the extruder into the die section where the semi-solid product was shaped into a desired form. The die and barrel of the extruder were set up with heating and/or cooling mechanisms. During extrusion, the die was maintained at a temperature of about 185° F. After extrusion through the die, the shaped product was allowed to solidify.

Extrusion of Formulation O resulted in a solid product indicating the presence of a binder formed from HEDTA and water. Extrusion of Formulation P also resulted in a solid product indicating the presence of a binder formed from HEDTA and water. The extrudate of Formulation P solidified faster and harder than that of Formulation O. Extrusion of Formulation Q also resulted in a solid product indicating the presence of a binder formed from HEDTA and water. During extrusion of Formulation Q, it was noted that there was some buildup of solid material within the dye, but a solid product was produced.

Example 6

Comparing HEDTA and Water Solid Binder to HEDTA and Methanol Mixture

In this example, two formulations were made, one including water and HEDTA and another including methanol and HEDTA. The first formulation included 93% by wt. HEDTA and 7% by wt. Water, and was created by admixing the HEDTA and water in the correct wt. % in a specimen cup. The composition was mixed for about 30 to 45 seconds. It was noted during mixing that the composition progressively got harder as the mixing progressed. The formulation was then allowed to stand for 10 minutes, at which time it was found to have solidified to produce a solid tablet. The composition was allowed to stand overnight is a sealed specimen cup. The next morning, the solid tablet was popped out of the specimen cup.

The second composition included 93% by wt. HEDTA and 7% by wt. methanol, and was created by admixing the HEDTA and methanol in the correct wt. % in a specimen cup. The composition was mixed for about 30 to 45 seconds. It was noted during mixing that the composition never hardened into a solid tablet. The formulation was then allowed to stand overnight is a sealed specimen cup. The next morning, the composition was examined and it was observed that the composition never hardened into a solid tablet, but rather was in a powder state.

Example 7

DSC Analysis of HEDTA, HEDTA and Water Solid Binders and Composition Including HEDTA and Water Solid Binder Three compositions were analyzed through differential scanning calorimetry (DSC). The first composition was a 5.4 mg sample of HEDTA raw material. The second composition was a 6.6 mg sample of a solid binding agent comprising 93% by wt. HEDTA and 7% by wt. water. The third composition was a 6.7 mg sample of a composition in accordance with formulation A in Example 3 above. The thermal analysis was performed using a differential scanning calorimeter commercially available from Perkin Elmer. In each analysis, stainless steel pans were used. During each analysis, the samples were heated from 20° C. to 200° C. The samples were initially held for 1 minute at 20° C., and thereafter heated from 20° C. to 200° C. at a rate of 10° C./minute. The results indicate the formation of a solid binding agent including a distinct species formed with HEDTA and water.

The above specification, examples and data provide a complete description of the manufacture and use of some example embodiments of the invention. It should be understood that this disclosure is, in many respects, only illustrative. Changes may be made in details, particularly in matters of components, composition, shape, size, and arrangement of steps without exceeding the scope of the invention. The invention's scope is, of course, defined in the language in which the appended claims are expressed.

What is claimed is:

1. A solid cleaning composition, comprising:

(a) one or more functional ingredients including at least one of a chelating agent; a sequestering agent; an inorganic detergent; an alkaline source; an organic detergent; a surfactant; a rinse aid; a bleaching agent; a sanitizer; an anti-microbial agent; an activator; a detergent builder; a filler; a defoaming agent; an anti-redeposition agent; an optical brightener; a dye; an odorant; a secondary hardening agent; a solubility modifier; a pesticide; a bait for pests; or mixtures or combinations thereof; and a solid binding agent distributed throughout the solid cleaning composition for binding the one or more functional ingredients, the solid binding agent comprising hydroxyethylethylenediaminetriacetic acid (HEDTA) and water, wherein a ratio of HEDTA to water by weight is 6:1 to 18:1, with HETA constituting about 25% to about 93% by weight of a total weight of the solid cleaning composition.

2. The composition of claim 1, wherein the ratio of HEDTA to water by weight is about 9:1.

3. The composition of claim 1, wherein the HEDTA constitutes about 30% to about 93% by weight of the total weight of the solid cleaning composition.

4. The composition of claim 1, wherein the composition further comprises sodium tripolyphosphate.

5. The composition of claim 1, wherein the composition further comprises a linear alcohol.

6. The composition of claim 1, wherein the composition further comprises a linear alkylate sulfonate.

7. The composition of claim 1, wherein the composition further comprises an alkali metal salt.

8. The composition of claim 1, wherein the composition further comprises an alkali metal silicate.

9. The composition of claim 4, wherein the composition includes less than a weight ratio of about 20.3:1 of tripolyphosphate over HEDTA to water.

10. The composition of claim 1, wherein the composition is extruded to form a solid block.

11. The composition of claim 1, wherein the composition is formed into a solid mass having a weight in the range of 50 grams or less.

12. The composition of claim 1, wherein the composition is formed into a solid mass having a weight in the range of 50 grams or greater.

13. The composition of claim 1, wherein the composition is formed into a solid mass having a weight in the range of 500 grams or greater.

14. The composition of claim 1, wherein the composition is formed into a solid mass having a weight in the range of 1 kilogram or greater.

15. The composition of claim 1, wherein the composition is cast into a solid shape.

16. The composition of claim 1, wherein the composition is extruded into a solid shape.

17. The composition of claim 1, wherein the composition is formed into a solid shape.

18. The composition of claim 1, wherein the solid is in the form of a pellet.

19. The composition of claim 1, wherein the composition is in the form of a solid block formed within a container.

20. A solid cleaning composition produced by the process comprising:

providing one or more functional cleaning ingredients including at least one of a chelating agent; a sequestering agent; an inorganic detergent; an alkaline source; an organic detergent; a surfactant; a rinse aid; a bleaching agent; a sanitizer; an anti-microbial agent; an activator; a detergent builder; a filler; a defoaming agent; an anti-redeposition agent; an optical brightener; a dye; an odorant; a secondary hardening agent; a solubility modifier; a pesticide; a bait for pests; or mixtures or combinations thereof;

providing hydroxyethylethylenediaminetriacetic acid (HEDTA) such that the HEDTA constitutes about 25% to about 93% by weight of a total weight of the solid cleaning composition;

providing water, such that a ratio of HEDTA to water by weight is at least about 6:1 to 18:1; and admixing the one or more functional cleaning ingredients, the HEDTA, and the water such that the HEDTA and water form a solid binding agent distributed throughout the solid cleaning composition for binding the one or more functional cleaning ingredients within the solid cleaning composition.

21. The solid cleaning composition of claim 20 wherein the ratio of HEDTA to water by weight is about 9:1.

22. A method of forming a solid cleaning composition, the method comprising:

providing one or more functional cleaning ingredients including at least one of a chelating agent; a sequestering agent; an inorganic detergent; an alkaline source; an organic detergent; a surfactant; a rinse aid; a bleaching agent; a sanitizer; an anti-microbial agent; an activator; a detergent builder; a filler; a defoaming agent; an anti-redeposition agent; an optical brightener; a dye; an odorant; a secondary hardening agent; a solubility modifier; a pesticide; a bait for pests; or mixtures or combinations thereof;

providing hydroxyethylethylenediaminetriacetic acid (HEDTA) such that the HEDTA constitutes about 25% to about 93% by weight of a total weight of the solid cleaning composition;

providing water, such that a ratio of HEDTA to water by weight is 6:1 to 18:1; and admixing the one or more functional cleaning ingredients, the HEDTA, and the water such that the HEDTA and form a solid binding agent distributed throughout the solid cleaning composition for binding the one or more functional cleaning ingredients within the solid cleaning composition.

23. The method of claim 22, wherein the ratio of HEDTA to water is about 9:1.

24. The method of claim 22, wherein the HEDTA constitutes about 30% to about 93% by weight of the total weight of the solid cleaning composition.

25. The method of claim 22, wherein the composition further comprises sodium tripolyphosphate.

26. The method of claim 22, wherein the composition further comprises a linear alcohol.

27. The method of claim 22, wherein the composition further comprises a linear alkylate sulfonate.

28. The method of claim 22, wherein the composition further comprises an alkali metal salt.

29. The method of claim 22, wherein the composition further comprises an alkali metal silicate.

30. The method of claim 25, wherein the composition includes less than a weight ratio of about 20.3:1 of tripolyphosphate over HEDTA to water.

31. The method of claim 22, wherein the composition is extruded to form a solid block.

32. The method of claim 22, wherein the composition is formed into a solid mass having a weight in the range of 50 grams or less.

33. The method of claim 22, wherein the composition is formed into a solid mass having a weight in the range of 50 grams or greater.

34. The method of claim 22, wherein the composition is formed into a solid mass having a weight in the range of 500 grams or greater.

35. The method of claim 22, wherein the composition is formed into a solid mass having a weight in the range of 1 kilogram or greater.

36. The method of claim 22, wherein the composition is cast into a solid shape.

37. The method of claim 22, wherein the composition is extruded into a solid shape.

38. The method of claim 22, wherein the composition is formed into a solid shape.

39. The method of claim 22, wherein the solid is in the form of a pellet.

40. The method of claim 22, wherein the solid composition is in the form of a solid block formed within a container.

* * * * *